US007464367B2

(12) United States Patent
Wain et al.

(10) Patent No.: US 7,464,367 B2
(45) Date of Patent: Dec. 9, 2008

(54) METHOD AND SYSTEM FOR DESIGNING CUSTOMIZABLE APPLICATIONS AND USER-INTERFACES BASED ON USER-DEFINED POLICIES AND METADATA

(75) Inventors: Mark N. Wain, Seattle, WA (US); Dharma Shukla, Sammamish, WA (US); Mayank Mehta, Bellevue, WA (US); David Fong, Kirkland, WA (US); Aditya Bhandarkar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 648 days.

(21) Appl. No.: 10/619,128

(22) Filed: Jul. 14, 2003

(65) Prior Publication Data

US 2005/0015745 A1    Jan. 20, 2005

(51) Int. Cl.
G06F 9/44 (2006.01)
G06F 3/00 (2006.01)
(52) U.S. Cl. .................. 717/105; 717/106; 717/113; 715/762
(58) Field of Classification Search .................. None
See application file for complete search history.

(56) References Cited

U.S. PATENT DOCUMENTS

| 6,208,345 B1 * | 3/2001 | Sheard et al. ............... 715/853 |
| 6,678,889 B1 * | 1/2004 | Burkett et al. ............... 718/104 |
| 6,976,059 B1 * | 12/2005 | Rogalski et al. ............. 709/218 |
| 6,990,654 B2 * | 1/2006 | Carroll, Jr. .................. 717/109 |
| 7,152,229 B2 * | 12/2006 | Chong et al. ................ 717/146 |
| 2006/0015847 A1 * | 1/2006 | Carroll, Jr. .................. 717/109 |

OTHER PUBLICATIONS

Savidis, A. and Stephanidis, C., "The Homer UIMS for Dual User Interface Development: Fusing Visual and Non-Visual Interactions," *Interacting with Computers*, vol. 11, No. 2, Dec. 15, 1998, pp. 173-209.
Savidis, A. and Stephanidis, C., "Developing Dual User Interfaces for Integrating Blind and Sighted Users; the Homer UIMS," *Human Factors in Computing Systems CHI'95 Conference Proceedings*, May 7-11, 1995, pp. 106-113.
Cockton, G., "User Interface Managers, Interface Components and Re-Use," *IEE Colloquium on Formal Methods and Human-Computer Interactions*, Feb. 22, 1998, pp. 3/1-5.
Rust, D.M., "Introduction to X Window Application Development," *Master's Thesis, Naval Postgraduate School*, Monterey, CA., Mar. 23, 1992.

* cited by examiner

*Primary Examiner*—Michael J Yigdall
(74) *Attorney, Agent, or Firm*—Workman Nydegger

(57) ABSTRACT

The present invention enables a user to build user-interfaces and applications based on a policy that contains metadata. The user can build an application through the user-interface, in which the user-interface and the generated computer-executable instructions are consistent with the policy. A user-interface has a toolbox that indicates the discovered components and a design surface that displays applicable stages. The policy determines the stages, where each stage provides a grouping of components having related tasks. The user selects components from the toolbox so that the selected components are associated with the selected stages on the design surface. After the user has completed building an application, a representation of the application may be compiled in order to generate a set of computer-executable instructions. Moreover, the compiler is coupled to the policy so that the set of computer-executable instructions is consistent with the policy.

34 Claims, 6 Drawing Sheets

METHOD AND SYSTEM FOR DESIGNING CUSTOMIZABLE APPLICATIONS AND USER-INTERFACES BASED ON USER-DEFINED POLICIES AND METADATA

FIELD OF THE INVENTION

The present invention relates to designing customizable software applications and user-interfaces.

BACKGROUND OF THE INVENTION

One of the major objectives of software design is to develop customizable software applications more expeditiously, with less effort by the software programmer, where the resulting software has fewer errors. In other words, the goal is to produce customizable applications having lower costs and with higher quality. A number of approaches have been supported in the prior art. Structured programming makes it feasible to build larger-scale software systems with a specification of the desired results at the start of the project, in which the specification is static. Object-oriented programming facilitates the reorganization of code when the specification changes because functionality is split up into classes that are designed to have minimal interaction. However, each change to the specification still requires programmer intervention, typically requiring a redesign/reimplement/rebuild/retest cycle. Also, dynamic programming languages, such as CLOS (Common Lisp Object System) and the Dylan programming language, allow the software programmer to delay decisions about the structure of the program (corresponding to the customizable application) and the data that it manipulates. For example, in Dylan, a running program can add a method to an existing class without access to the original source code, can define a new class or function under program control, and can debug another Dylan program, even though another program may be running remotely over the web. However, this approach relates to the programmer interacting with the program, in which knowledge of the underlying programming language is necessary.

There is a real need in the industry that removes the software programmer from the level of the underlying software language. Moreover, there is a real need for methods and systems that enable a programmer to focus on rules and constraints that are associated with a well-defined specific application.

BRIEF SUMMARY OF THE INVENTION

The present invention provides methods and systems that enable a user to build user-interfaces and applications based on a policies and metadata. The user can build an application through the user-interface, in which the user-interface and the generated computer-executable instructions are consistent with the policy.

In an aspect of the invention, a designer system discovers components accessible to the designer system and constructs a user-interface in concert with a policy. The user-interface may contain a toolbox that indicates the discovered components and a design surface that displays applicable stages. The policy determines the stages, where each stage provides a grouping of components having related tasks. The user selects available components from the toolbox so that the selected components are associated with the selected stages on the design surface. The user can customize different applications from the policy by selecting components in accordance with a desired operation of the application. After the user has completed building an application, a representation of the application, which may be implemented as an extensible markup language (XML) file, is compiled in order to generate a set of computer-executable instructions. Moreover, the compiler is coupled to the policy so that the set of computer-executable instructions is consistent with the policy.

With an aspect of the invention, a cardinality of components that are associated with a stage may ordered sequentially or may be selected where the selected component matches a document being processed by the application.

With another aspect of the invention, the user may select properties that may be associated with a component, thus providing additional flexibility in tailoring an application.

With another aspect of the invention, a policy is selected from a cardinality of policies, depending on the type of application that the user wishes to build. Based on this policy, a custom user-interface is generated. The user may select a policy from previously authored policies or may author policies for specialized applications.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Figure 1:
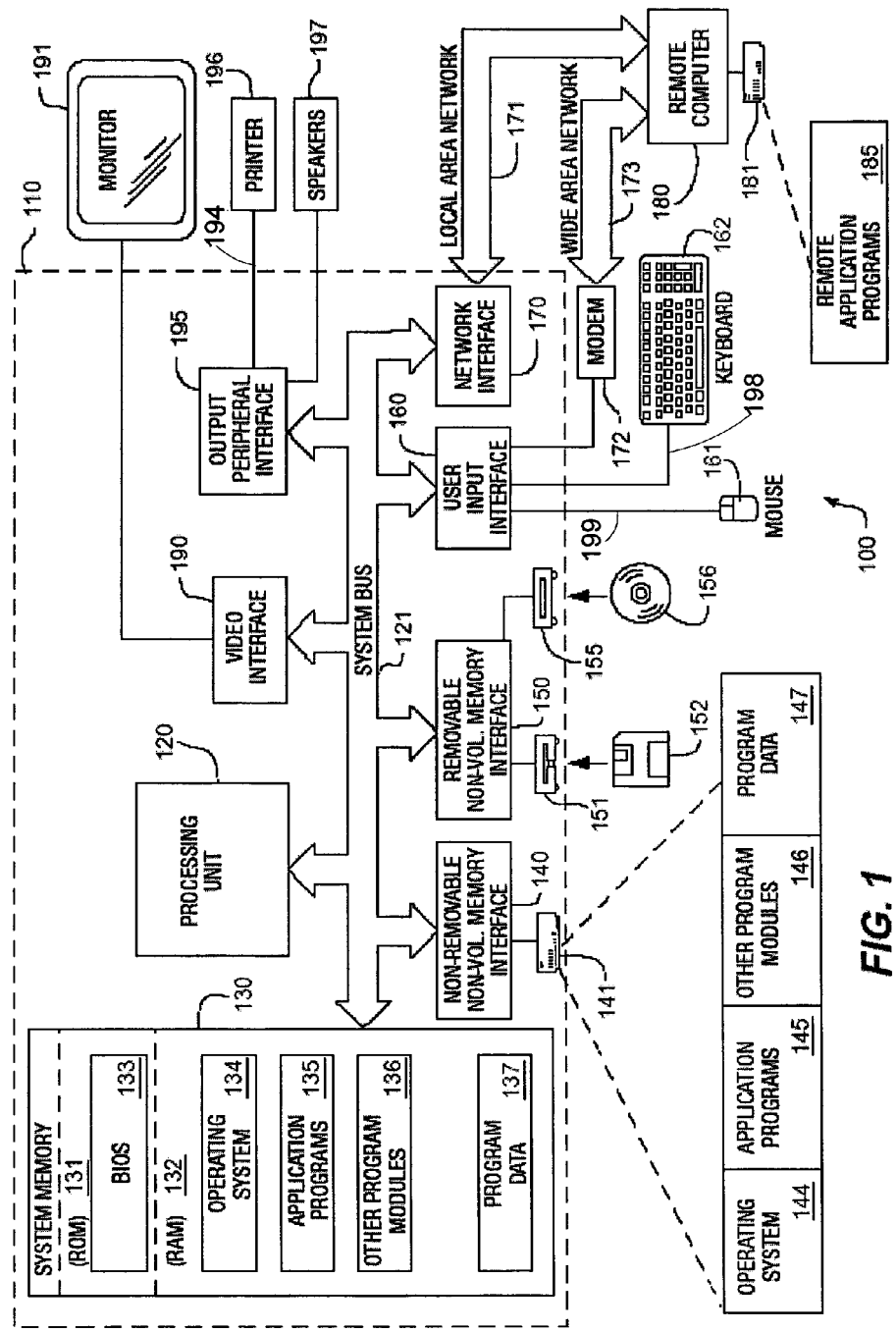
FIG. 1 illustrates an example of a suitable computing system environment on which the invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of constituent items illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Constituent items of the computer 110 may include, but are not limited to, a processing unit 120, a system memory 130, and a system bus 121 that couples various system constituent items, including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these constituent items can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

In an embodiment of the invention, the pointing device 161 may be implemented as a mouse with an optical sensor for detecting movement of the mouse. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The computer 110 may support an operating environment for generating a user interface for building a customizable application as discussed in the context of FIGS. 2-6. In an embodiment, the computer 110 is the platform for a designer system, on which a user may build a customizable application. The computer 110 stores a policy in the system memory. The processing unit 120 constructs a user-interface, in accordance with the policy, and displays the user interface to a user on the monitor 191 through the video interface 190. (Another embodiment stores the policy on the remote computer 180 and the computer 110 retrieves contents of the policy through the modem 172 or the network interface 170.) The user can utilize the user interface by manipulating the user-interface with a peripheral device (e.g. mouse 161) in order to build a customizable application. The customizable application may be subsequently executed on the computer 110 or may be executed on the remote computer 180. While FIG. 1 illustrates one applicable environment in which an embodiment of the invention may operate, other embodiments of the invention may be applicable to other operating environments.

Another embodiment may support a distributed architecture, where different functions of the designer system are supported by different computers. For example, the user-interface may be generated by the computer 110 and the policy may be stored in a different computer. In such a case, the computer 110 may retrieve metadata from the other computer through a data link between the computers.

Figure 2:
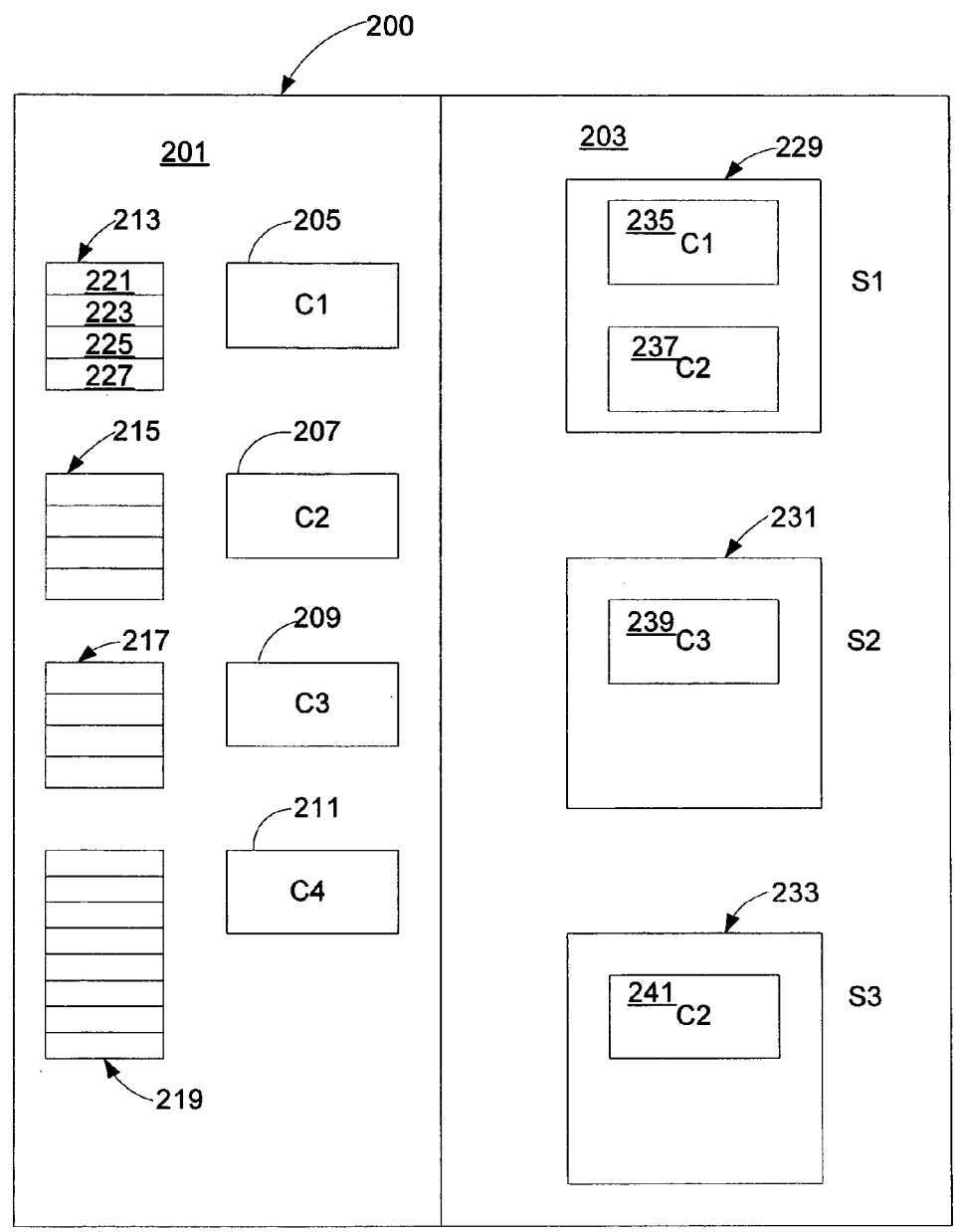
FIG. 2 illustrates a design surface of a user-interface that enables a user to build a customizable application in accordance with an embodiment of the invention.

FIG. 2 illustrates a user-interface 200 that enables a user to build a customizable application in accordance with an embodiment of the invention. The user-interface 200 is typically displayed to the user on a video display device (e.g. monitor 191), in which the user can manipulate the user interface 200 by conveying commands through a peripheral device (e.g. mouse 161). In the embodiment shown in FIG. 2, the user-interface 200 comprises two regions. A first region corresponds to a toolbox 201 that shows available components that may be used to construct a customizable application. A component is a software module that performs a specific function, e.g. performing MIME (Multipurpose Internet Mail Extensions) encoding. A component typically corresponds to a segment of computer-executable instructions being generated by a compilation module. The toolbox 201 contains available components 205-211. (The user is not obligated to use all of the available components in building an application.) In the embodiment, the designer system accesses the system memory 130 to discover accessible components that are appropriate for the customizable application.

A second region corresponds to a design surface 203. The user may "drag and drop" available components from the toolbox 201 onto the design surface 203 into regions of the design surface. The design surface shows stages 229, 231, and 233 that correspond to the customizable application in accordance with the associated policy. (The policy is a set of rules that are applicable to the customizable application. The policy is described in more detail in the context of FIG. 3.) A stage provides a grouping of components having related tasks. For example, a decoding stage may include a decoding algorithm component and a decryption component. In the exemplary embodiment shown in FIG. 2, stage 229 is associated with components 235 and 237. Stage 231 is associated with a component 239. Stage 233 is associated with the component 241. Even though each stage is associated with at least one component, the user-interface may allow that a stage is not associated with any components for a customizable application. The embodiment also has the flexibility of using a same available component from toolbox 201 for different stages (e.g. component 207 is selected for stage 229 as the component 237 and for stage 233 as the component 241). However, components 237 and 241 may be associated with different properties as will be discussed.

The user selects components that are associated with each stage. Each selected component may be associated with at least one property. For example, components 205, 207, 209, and 211 are associated with property sets 213, 215, 217, and 219, respectively. The property set 213 comprises properties 221, 223, 225, and 237. (For example, an encoding module may utilize a different algorithm by the user selecting an algorithmic property from the property set.) The user may choose properties that are associated with the associated component for the customizable application. As shown in FIG. 2, properties of a component are displayed in a separate window (e.g. a popup window) whenever the component is selected from the toolbox 201. However, other embodiments may display the properties if a component using different approaches. For example, a separate region of the user-interface may be used to display component properties. Also, a component from the toolbox 201 (e.g. component 207) may have different properties if selected for different stages in the design surface (e.g. component 237 and 241).

Figure 3:
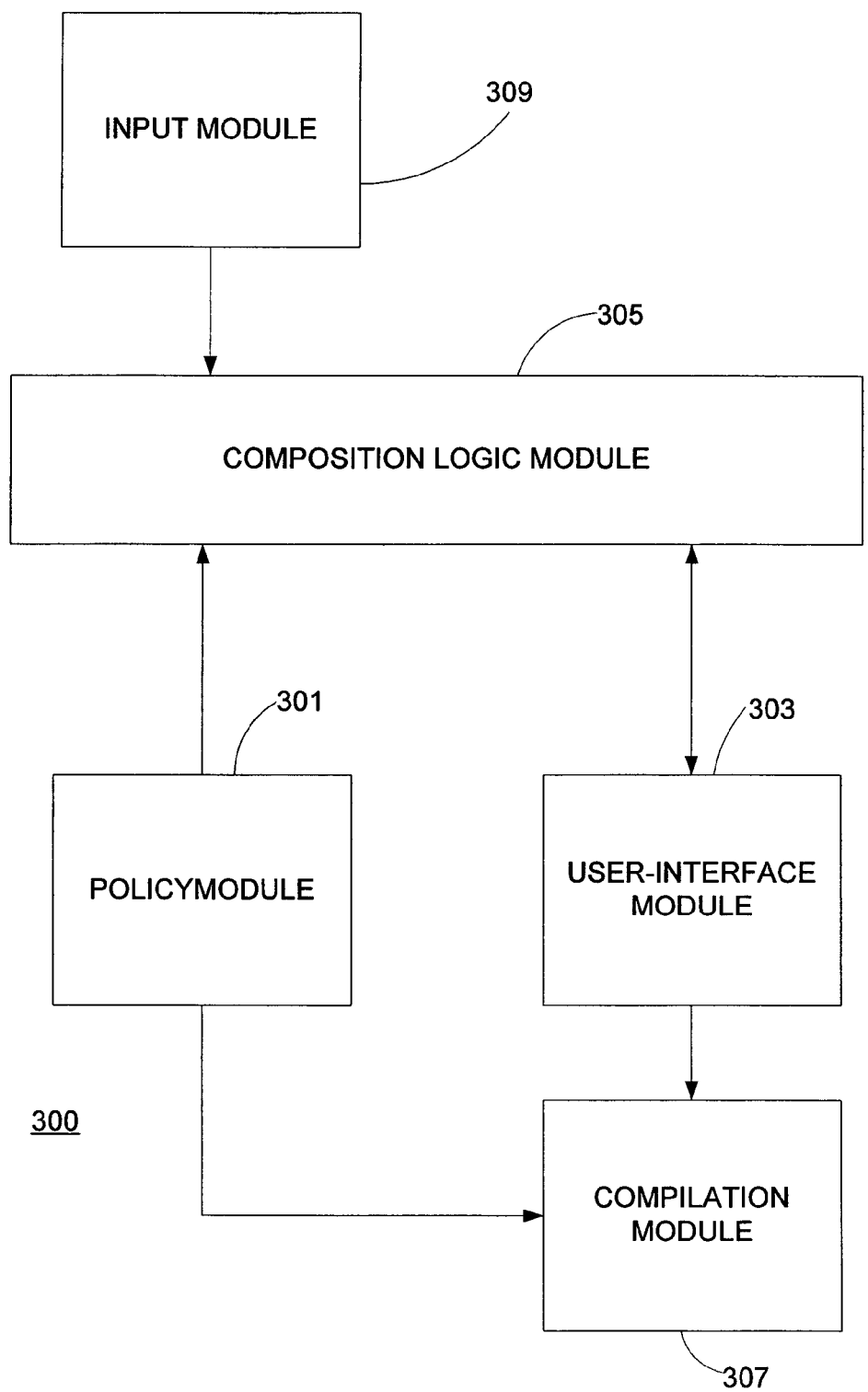
FIG. 3 illustrates an architecture that supports a user-interface and the building of a customizable application in accordance with an embodiment of the invention.

FIG. 3 illustrates an architecture 300 of the designer system that supports a user-interface and the building of a customizable application in accordance with an embodiment of the invention. The architecture 300 comprises a policy module 301, a user-interface module 303, a composition logic module 305, a compilation module 307, and an input module. The policy module 301 contains metadata that reflects a set of rules for stages and for components. (In the embodiment, a policy may be contained within the metadata.) A stage may be associated with components, where each component may be associated with a set of properties. Also, a component may be restricted with respect to coupling (linking) to other components. (For example, a disassembly component typically occurs after a decoding component but does not occur before the verify properties component. Also, a decoding component is not typically coupled to a verify properties component.)

Depending on the application type selected by a user, the policy module 301 activates the corresponding policy. Also, the composition module 305 may discover appropriate components from system memory 130 or remote computer 180 (as shown in FIG. 1). Symbolic images of the discovered available components are displayed in the user-interface through user-interface module 303. Whenever a user attempts to manipulate the user-interface (e.g. dragging and dropping an available component from the toolbox 201 onto the design surface 203) through the input module 309, the user-interface module 303 verifies that the operation is consistent with the policy module 301 through the composition logic module 305. (The input module 309 may support an interface to a input peripheral device (e.g. the mouse 161 and/or the keyboard 162) so that the user can input commands to the user-interface. When the user has completed the design of the customizable application, as may be revealed with a graphical representation of the application, the user interface module 303 provides a descriptive file (e.g. an extensible markup language (XML)) that specifies the application to the compilation module 307. The descriptive file is consistent with the graphical representation and may be equivalent. In the embodiment, the descriptive file specifies the stages, the association of the components to the stages, and the properties of the components. The compilation module 307 generates executable code (e.g. assembly code) that is executed on an execution engine (not shown in FIG. 3) to support the application. For example, the compilation module 307 may transform the descriptive file into C# (C sharp) code, compile the C# code, and subsequently run the compiled code through an assembler. However, other embodiments of the invention may use other computer languages.

The compilation module 307 verifies that the descriptive file from the user-interface module 303 and the resulting computer-executable code are consistent with the metadata from the policy module 301.

While the architecture 300 supports system configurations in which the policy module 301 is co-located with the composition logic module 305 and/or the user-interface module 303, the architecture 300 also supports system configurations in which the policy module 301 is located on a remote computer, e.g. the remote computer 180 as shown in FIG. 1. In a remote configuration, the policy module 301 returns metadata about an entity of a user-interface (e.g. a stage or a component) in response to receiving a query request from a remote location.

Figure 4:
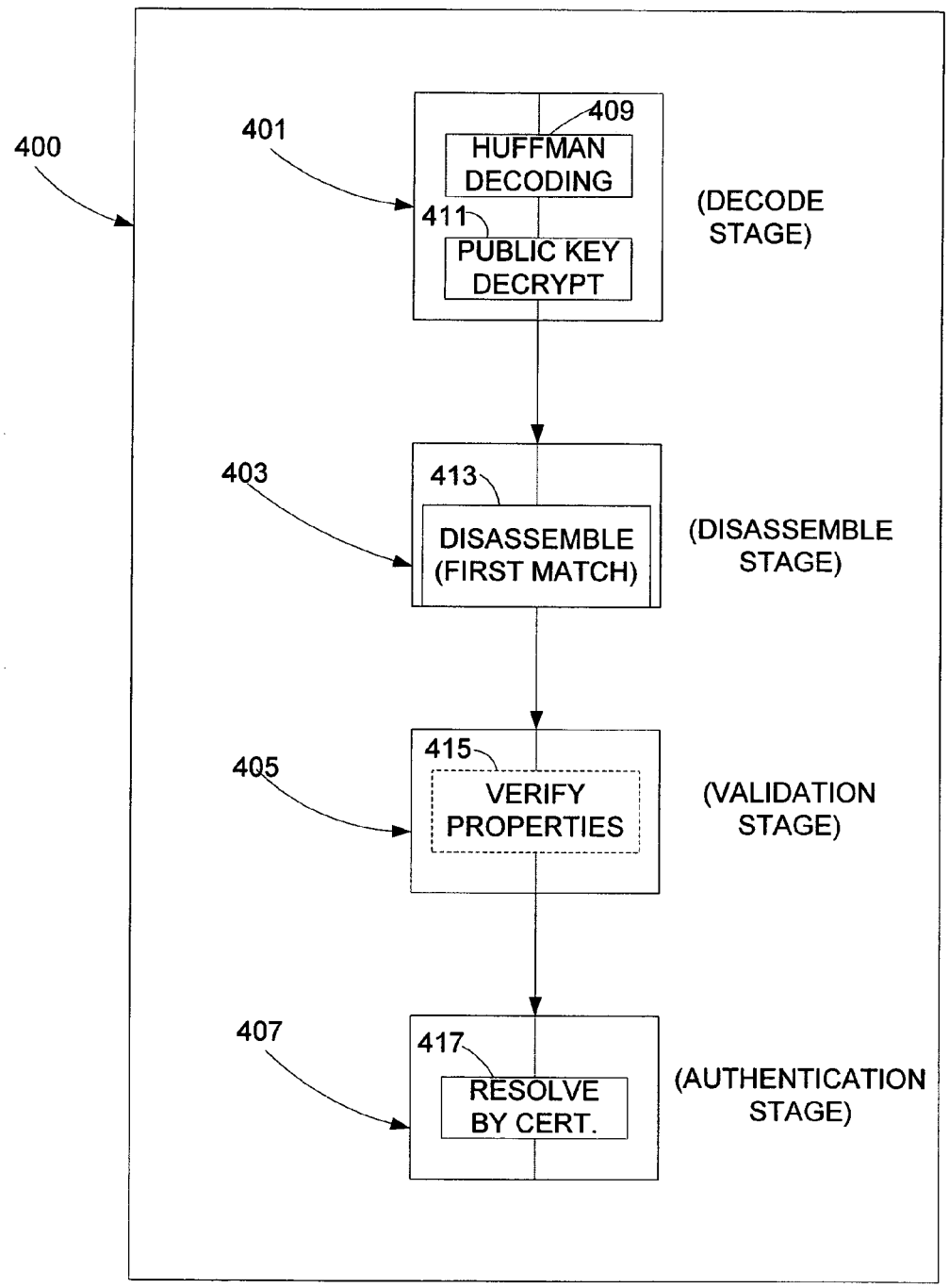
FIG. 4 illustrates a graphical representation of a customizable application that is built through a user-interface in accordance with an embodiment of the invention.

FIG. 4 illustrates a graphical representation 400 of a customizable application that is built through a user-interface in accordance with an embodiment of the invention. The graphical representation 400, corresponding to a receive message process, may be translated to a corresponding descriptive file (e.g. an XML file). In accordance with a selected policy, the graphical representation 400 includes a decode stage 401, a disassemble stage 403, a validation stage 405, and an authentication stage 407. For example, a received message (which may be a document, e.g. a purchase order request containing a plurality of purchase orders) is first processed by the decode stage 401 The decode stage 401 first decodes the document using a Huffman decoding component (corresponding to a component 409) and then decrypts the message using public key decryption component (corresponding to a component 411). (Huffman coding assigns a variable length of bits to source symbols (e.g. ASCII characters) according to the probability of the source symbols.) Thus, decode stage 401 is configured so that associated components (e.g. components 409 and 411) are sequentially processed. In another embodiment, decode stage 401 may include only a decode component, e.g. corresponding to MIME (Multipurpose Internet Mail Extensions) or S/MIME (Secure/MIME). Metadata, as contained in the policy module 301, determines constraints on the allowed configurations for building an application.

The output from decoding stage 401 is subsequently processed by disassemble stage 403. For example, the received document may include a plurality of purchase orders that must be routed to different departments within a business. Stage 403 includes a component 413 that disassemblies the received documents into separate documents (e.g. separate purchase orders) that are processed by different organizations. Moreover, a received document may assume different formats (e.g. a flat format, an XML format, or a custom format). Thus, dissemble stage 403 may contain a plurality of disassemble components, where one of the components is selected in accordance with the component first matching the data format of the received document.

Validation stage 405 includes a verify properties component 415 that further validates that properties of a received XML document are set in accordance with the XML schema. Finally, authentication stage 407 includes a resolve by certificate component 417 that ascertains that the received document is received from an entity that is identified in the received document. In the exemplary embodiment, the toolbox may include an alternative component, in which authentication is verified by an identification field within the document.

Figure 5:
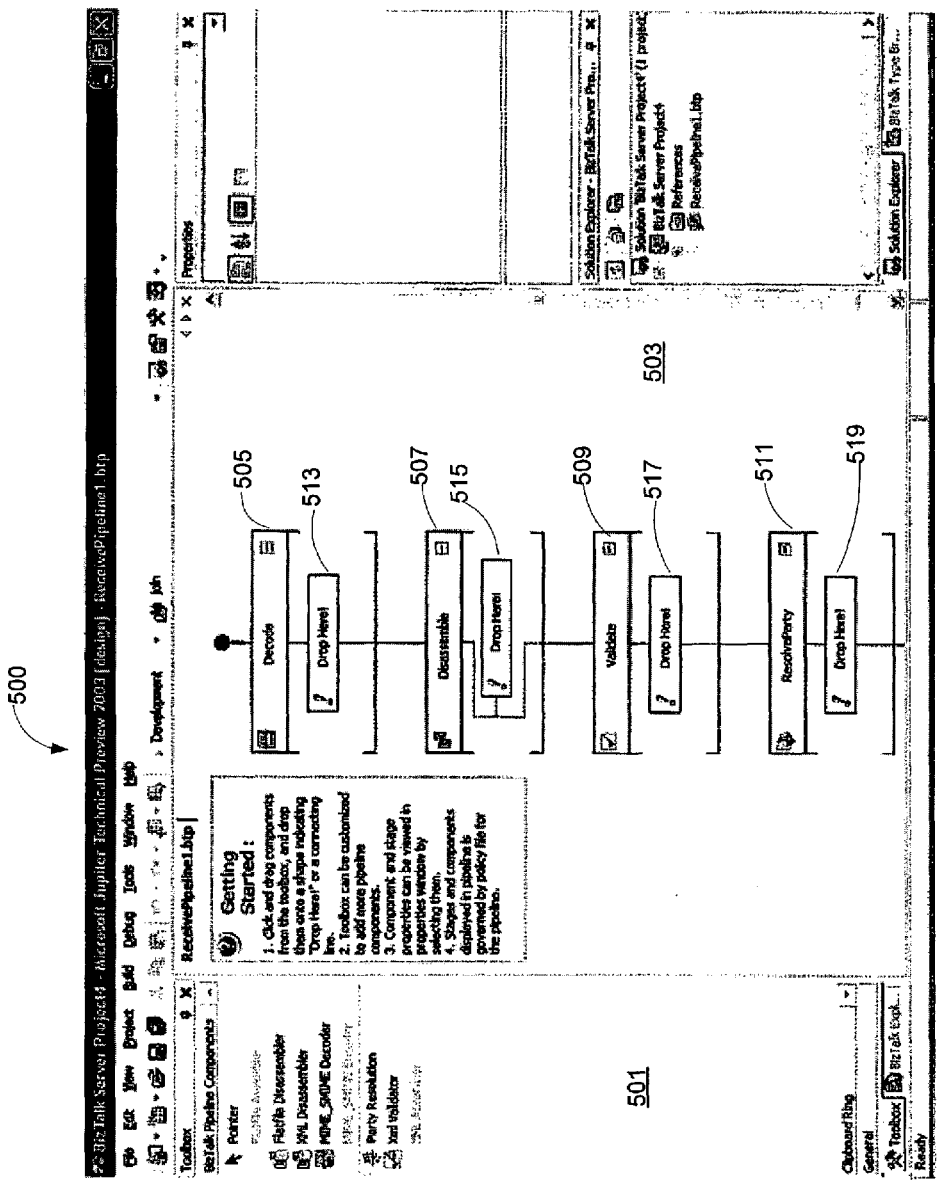
FIG. 5 shows a screen shot of a user-interface for a receive pipeline policy in accordance with an embodiment of the invention.
Figure 6:
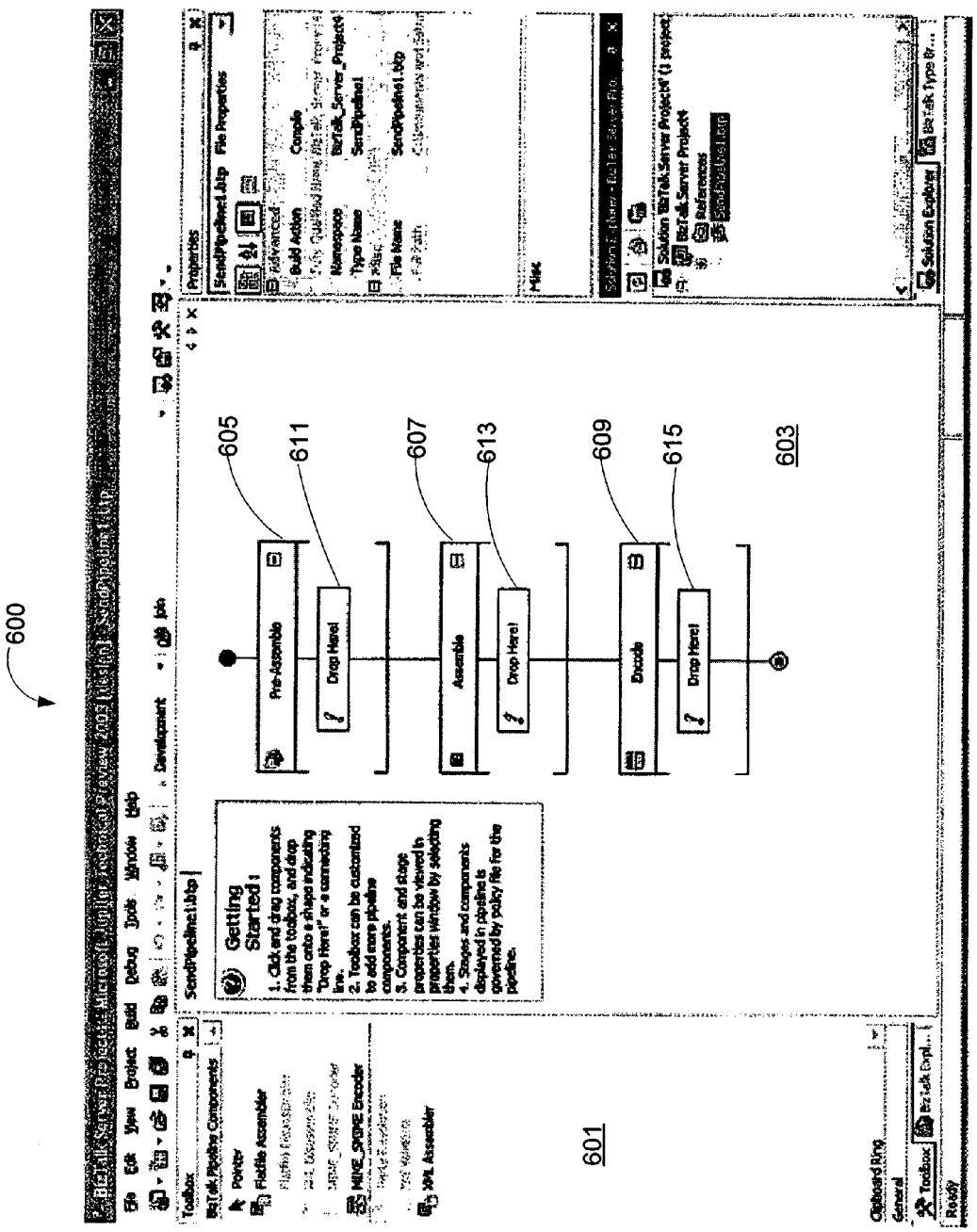
FIG. 6 shows a screen shot of a user-interface for a transmit pipeline policy in accordance with an embodiment of the invention.

A user may modify graphical representation 400 of the application (pipeline) by selecting different components from a toolbox (e.g. toolbox 201) and by dragging and dropping the selected component into a designated region of the design surface (e.g. "Drop Here!" regions as shown in FIGS. 5 and 6). The user may also delete a selected component from a stage and subsequently replace the deleted component with another component in order to modify the application.

FIG. 5 shows a screen shot 500 of one example of a user-interface for a receive pipeline policy in accordance with an embodiment of the invention. Upon the invocation of a receive_pipeline user-interface on the designer system, the receive pipeline policy is selected. The screen shot 500 has a toolbox 501 that contains components that may be selected by the user to build an application for receiving documents. A design surface 503 supports a Decode stage 505, a Disassemble stage 507, a Validate stage 509, and a ResolveParty stage 511. Stages 505-511 are configured within the design surface 503 in accordance with the receive pipeline policy. As an example, a user can drag and drop one of the disassemblers ("Flatfile Disassembler" or "XML Disassembler") from toolbox 501 into a region 517 in order to associate the selected disassembler with validate stage 509. If the user drags and drops both the flatfile disassembler and the XML disassembler into region 517, the application will match a document, when the application is being executed, to one of the disassemblers. (In this case, the policy specifies that the execution method of the stage is "first matched" as will be discussed.)

A user can select a component (e.g. a MIME_SMIME decoder) and drop the component into a region 513 to be associated with decode stage 505. Similarly, the user can select the flat file disassembler and/or the XML disassembler and drop the components into a region 515 to be associated with disassemble stage 507. However, if the user attempts to drop a component that cannot be associated with the stage, as determined from the receive pipeline policy (e.g. associating the MIME/SMIME decoder component with disassemble stage 507, an indicator will appear on the design surface indicating that the attempted operation is not permitted.

While the above discussion is centered around message-related applications, other embodiments of the invention may support other types of applications by authoring different policies. For example, a policy may be authored to support credit card transaction applications.

FIG. 6 shows a screen shot 600 of a user-interface for a transmit pipeline policy in accordance with an embodiment of the invention. In accordance with the transmit pipeline policy, a design surface 603 is configured to display a pre-assemble stage 605, an assemble stage 607, and an encode stage 609. The user drops available components from a toolbox 601 into regions 611-615 in order to associate components with stages 605-609. The components in toolbox 601 are used for transmitting a document, while the components in toolbox 501 (as shown in FIG. 5) are used for receiving a document. For example, the MIME_SMIME encoder component in toolbox 601 corresponds to the MIME_SMIME decoder component in toolbox 501. While not shown in screen shot 600, another embodiment may support two different encoder components in the toolbox if different encoding/decoding schemes are supported. The user can select the appropriate components to support the encoding/decoding scheme.

The following listing shows a portion of an XML file that represents a receive pipeline policy for configuring stages (corresponding to FIG. 5).

```
<?xml version="1.0" encoding="utf-8"?>
<Document xmlns:xsd="http://www.w3.org/2001/XMLSchema"
xmlns:xsi="http://www.w3.org/2001/XMLSchema-instance" CategoryId = "F66B9F5E-
43FF-4f5f-BA46-885348AE1B4E" FriendlyName = "Receive">
<Stages>
    <Stage__locAttrData="Name" __locID="1" Name = "Decode" minOccurs = "0"
    maxOccurs = "-1" stageId = "9d0e4103-4cce-4536-83fa-4a5040674ad6"
    execMethod = "All"></Stage>
    <Stage __locAttrData="Name" __locID="2" Name = "Disassemble" minOccurs =
    "0" maxOccurs = "-1" stageId = "9d0e4105-4cce-4536-83fa-4a5040674ad6"
    execMethod = "FirstMatch"></Stage>
    <Stage __locAttrData="Name" __locID="3" Name = "Validate" minOccurs = "0"
    maxOccurs = "-1" stageId = "9d0e410d-4cce-4536-83fa-4a5040674ad6"
    execMethod = "All"></Stage>
    <Stage __locAttrData="Name" __locID="4" Name = "ResolveParty" minOccurs =
    "0" maxOccurs = "-1" stageId = "9d0e410e-4cce-4536-83fa-4a5040674ad6"
    execMethod = "All"></Stage>
</Stages>
</Document>
```

Additionally, the policy may use additional rules to establish relationships between components and stages. Consequently, as can be appreciated by one having ordinary skill in the art, the XML file can be expanded to provide the additional rules. In the listing comprising an element for each stage, a configuration for the stages within the user-interface is established. Name attribute (e.g. NAME="Decode") determines the name of the stage. An ordering of the components within a stage is determined by the execMethod attribute. If execMethod="All", associated components are ordered sequentially. If execMethod="FirstMatch", the component that first matches the processed document is selected from the associated components of the stage so that the other component in the stage are not utilized for processing that batch of documents. Attribute maxOccurs determines a maximum number of components in a stage, and attribute minOccurs specifies a minimum number of components in the stage. (If maxOccurs equals -1, then the maximum number of components in the stage is not limited.) Attribute stageID is a global unique identifier of the stage. Attribute locID specifies an ordering of the stages on the design surface.

The following listing shows a portion of an XML file that represents a transmit pipeline policy (corresponding to FIG. 6).

While the above XML listings only specify the stages of an application, the XML files may be augmented to specify components and corresponding associations with the stages. In an embodiment, attributes are specified for associating a component to a stage, associating properties to the component, and indicating what other components may be coupled to the component.

While the exemplary embodiment utilizes XML files to implement a policy, other embodiments may utilize other equivalent data representations of the policy. For example, associated attributes of the policy may be contained in a flat file or a relational database.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

```
<?xml version="1.0" encoding="utf-8"?>
<Document xmlns:xsd="http://www.w3.org/2001/XMLSchema"
xmlns:xsi="http://www.w3.org/2001/XMLSchema-instance" CategoryId = "8C6B051C-
0FF5-4fc2-9AE5-5016CB726282" FriendlyName = "Transmit">
<Stages>
    <Stage __locAttrData="Name" __locID="1" Name = "Pre-Assemble" minOccurs =
    "0" maxOccurs = "-1" stageId = "9d0e4101-4cce-4536-83fa-4a5040674ad6"
    execMethod = "All"></Stage>
    <Stage __locAttrData="Name" __locID="2" Name = "Assemble" minOccurs ="0"
    maxOccurs = "1" stageId = "9d0e4107-4cce-4536-83fa-4a5040674ad6"
    execMethod = "All"></Stage>
    <Stage __locAttrData="Name" __locID="3" Name = "Encode" minOccurs = "0"
    maxOccurs = "-1" stageId = "9d0e4108-4cce-4536-83fa-4a5040674ad6"
    execMethod = "All"></Stage>
</Stages>
</Document>
```

We claim:

1. A computer-implemented method for designing an application, comprising:
   (a) receiving an application type selection from a user, the application type including which type of application is to be dynamically generated;
   (b) automatically selecting a corresponding policy based on the received application type selection;
   (c) dynamically constructing a user-interface in accordance with the policy, the policy including a set of rules for application stages and components; and
   (d) creating the application through the user-interface wherein (c) comprises:
      (i) creating a graphical representation of the application, the representation having at least one stage, each stage having at least one corresponding component;
      (ii) receiving a user input indicating a selection of one or more components that are to be incorporated into the application;
      (iii) determining that the user-selected components are in accordance with the automatically selected policy corresponding to the application type; and
      (iv) compiling the representation of the application including the user-selected components in accordance with the automatically selected policy.

2. The method of claim 1, wherein the user interface supports a design surface with a toolbox and wherein the toolbox has a plurality of available components.

3. The method of claim 2, wherein the stage further comprises at least one component selected from the plurality of available components of the toolbox.

4. The method of claim 3, wherein the representation is displayed in a graphical format.

5. A physical computer-readable storage medium storing computer-executable instructions for performing the method recited in claim 3.

6. The method of claim 1, wherein (c) comprises:
   (i) categorizing each component to one of a plurality of stages.

7. The method of claim 1, wherein the stage includes a first component and a second component, and wherein (c) comprises:
   (i) determining an ordering of the first component and the second component.

8. The method of claim 1, wherein (c) comprises:
   (i) determining a cardinality of the stage.

9. The method of claim 1, wherein one of the at least one component is associated with a plurality of properties.

10. The method of claim 9, wherein (d) further comprises:
    (iii) selecting one of the plurality of properties.

11. The method of claim 1, wherein (c) comprises:
    (i) discovering the at least one component that resides on a computer, the computer supporting the user-interface.

12. A physical computer-readable storage medium storing computer-executable instructions for performing the method recited in claim 11.

13. The method of claim 1, wherein the representation of the application is expressed as an extensible markup language (XML) file.

14. The method of claim 1, wherein (d) further comprises:
    (v) in response to (iv), executing a plurality of computer-executable instructions.

15. The method of claim 1, wherein (d) further comprises:
    (v) determining whether an error exists in the representation.

16. The method of claim 15, wherein (d) further comprises:
    (vi) in response to (v), indicating a determined component and a determined stage corresponding to the error.

17. The method of claim 1, wherein the stage is associated with a plurality of components, and wherein (d) further comprises:
    (v) selecting a matched component from the plurality components, the matched component first matching a document being processed.

18. A physical computer-readable storage medium storing computer-executable instructions for performing the method recited in claim 17.

19. The method of claim 1, wherein the stage is associated with a plurality of components, and wherein (d) further comprises:
    (v) determining whether the plurality of components shall be sequentially ordered.

20. A physical computer-readable storage medium storing computer-executable instructions for performing the method recited in claim 19.

21. The method of claim 1, wherein (d) comprises:
    (v) receiving a command from the user:
    (vi) in response to (v), indicating whether the command corresponds to a permitted operation for manipulating a representation of the application.

22. The method of claim 1, wherein (b) comprises:
    selecting the policy from a plurality of policies.

23. A physical computer-readable storage medium storing computer-executable instructions for performing the method recited in claim 1.

24. The method of claim 1, further comprising discovering appropriate components for the application based on the user-selected application type.

25. The method of claim 24, further comprising displaying symbolic images of all appropriate components.

26. The method of claim 24, further comprising:
    determining that the user has attempted to implement a component that is not appropriate for the user-selected application type; and
    preventing the user from implementing the component as the component is not appropriate for the user-selected application type.

27. The method of claim 1, further comprising modifying the graphical representation by performing at least one of the following:
    selecting one or more components from a toolbox; and
    dragging and dropping the selected component into a designated region of the graphical representation.

28. A system for designing an application, comprising:
    a processing unit;
    a receiving module that receives an application type selection from a user, the application type including which type of application is to be dynamically generated;
    a policy module that automatically selects a corresponding policy based on the received application type selection;
    a construction module that dynamically constructs a user-interface in accordance with the policy, the policy including a set of rules for application stages and components, the constructing including:
       creating a graphical representation of the application, the representation having at least one stage, each stage having at least one corresponding component;
       receiving a user input indicating a selection of one or more components that are to be incorporated into the application;

determining that the user-selected components are in accordance with the automatically selected policy corresponding to the application type; and compiling the representation of the application including the user-selected components in accordance with the automatically selected policy; and an application creation module that creates an application through the user-interface based on the compiled representation.

29. The system of claim 28, further comprising a display interface to a video display device, the video display device showing the design surface to the user.

30. The system of claim 28, further comprising:

a complier module that transforms the representation into a set of computer-executable instructions in accordance with the policy; and an execution engine that executes the set of computer-executable instructions.

31. The system of claim 28, further comprising:

a memory that stores software, the software supporting a component, wherein the application creation module discovers the component and provides a display indicator that is associated with the component.

32. The system of claim 28, wherein the policy module is co-located with the construction module.

33. The system of claim 28, wherein the policy module is remotely located from the construction module.

34. A computer program product for implementing a method for designing an application, the computer program product comprising one or more computer-readable storage media having thereon computer-executable instructions that, when executed by one or more processors of the computing system, cause the computing system to perform the method, the method comprising:

(a) receiving an application type selection from a user, the application type including which type of application is to be dynamically generated;

(b) automatically selecting a corresponding policy based on the received application type selection;

(c) dynamically constructing a user-interface in accordance with the policy, the policy including a set of rules for application stages and components; and (d) creating the application through the user-interface wherein (c) comprises:

(i) creating a graphical representation of the application, the representation having at least one stage, each stage having at least one corresponding component;

(ii) receiving a user input indicating a selection of one or more components that are to be incorporated into the application;

(iii) determining that the user-selected components are in accordance with the automatically selected policy corresponding to the application type; and (iv) compiling the representation of the application including the user-selected components in accordance with the automatically selected policy.

* * * * *

UNITED STATES PATENT AND TRADEMARK OFFICE
CERTIFICATE OF CORRECTION

| | | |
|---|---|---|
| PATENT NO. | : 7,464,367 B2 | Page 1 of 1 |
| APPLICATION NO. | : 10/619128 | |
| DATED | : December 9, 2008 | |
| INVENTOR(S) | : Mark N. Wain et al. | |

It is certified that error appears in the above-identified patent and that said Letters Patent is hereby corrected as shown below:

In column 12, line 27, in Claim 22, before "selecting" insert -- (i) --.

Signed and Sealed this
Twenty-sixth Day of April, 2011

David J. Kappos
*Director of the United States Patent and Trademark Office*